US009026855B2

(12) United States Patent
Sharma et al.

(10) Patent No.: US 9,026,855 B2
(45) Date of Patent: May 5, 2015

(54) FAULT LOCALIZATION IN DISTRIBUTED SYSTEMS USING INVARIANT RELATIONSHIPS

(71) Applicant: NEC Laboratories America, Inc., Princeton, NJ (US)

(72) Inventors: Abhishek Sharma, New Brunswick, NJ (US); Haifeng Chen, Old Bridge, NJ (US); Min Ding, Chalfont, PA (US); Kenji Yoshihira, Princeton Junction, NJ (US); Guofei Jiang, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 180 days.

(21) Appl. No.: 13/950,523

(22) Filed: Jul. 25, 2013

(65) Prior Publication Data

US 2014/0047279 A1     Feb. 13, 2014

Related U.S. Application Data

(63) Continuation-in-part of application No. 13/738,004, filed on Jan. 10, 2013, now Pat. No. 8,943,367.

(60) Provisional application No. 61/675,974, filed on Jul. 26, 2012.

(51) Int. Cl.
| G06F 11/00 | (2006.01) |
| G06F 11/07 | (2006.01) |
| H04L 12/24 | (2006.01) |
| H04L 12/26 | (2006.01) |

(52) U.S. Cl.
CPC .......... *G06F 11/0751* (2013.01); *G06F 11/079* (2013.01); *G06F 11/0709* (2013.01); *H04L 43/0817* (2013.01); *H04L 41/064* (2013.01); *H04L 41/0677* (2013.01)

(58) Field of Classification Search
CPC .................................................... G06F 11/079
USPC ..................................................... 714/37, 4.1
See application file for complete search history.

(56) References Cited

U.S. PATENT DOCUMENTS

| 7,698,463 | B2 * | 4/2010 | Ogier et al. | 709/242 |
| 7,764,617 | B2 * | 7/2010 | Cain et al. | 370/238 |
| 8,185,653 | B2 * | 5/2012 | Yau et al. | 709/238 |
| 2002/0062388 | A1 * | 5/2002 | Ogier et al. | 709/238 |
| 2007/0245034 | A1 * | 10/2007 | Retana et al. | 709/238 |
| 2012/0317098 | A1 * | 12/2012 | Okato et al. | 707/722 |

* cited by examiner

*Primary Examiner* — Dieu-Minh Le
(74) *Attorney, Agent, or Firm* — Joseph Kolodka

(57) ABSTRACT

A computer implemented method for temporal ranking in invariant networks includes considering an invariant network and a set of broken invariants in the invariant network, assuming, for each time point inside a window W, that each metric with broken invariants is affected by a fault at that time point, computing an expected pattern for each invariant of a metric with assumed fault, said pattern indicative of time points at which an invariant will be broken given that its associated metric was affected by a fault at time t, comparing the expected pattern with the pattern observed over the time window W; and determining a temporal score based on a match from the prior comparing.

8 Claims, 3 Drawing Sheets

Procedure 1 Localize faults in time and rank abnormal metrics

Input: set of all invariants $I$, list of broken invariants, $L_t$ at each time point $t \in [T-w, T]$, $T$: current time
for all $t \in [T-w, T]$ do
    anomalyScore[t] = timeScore(t,T,$\{L_j : j \in [t,T]\}$)
end for
Raise alarms for time points $t$ with *high* anomaly score; at each of these time points focus on metrics with high scores for further investigation.

Procedure 2 timeScore: computes a score to support the hypothesis that an anomaly occurred at time $t$ Input: lists of broken invariants $\{L_j : j \in [t,T]\}$, set of all invariants $I$, current time $T$.
Output: an anomaly score for time $t$.
for all metric $m$ with broken invariants in $L_t$ do
    score[m] = metricScore(m,$\{L_j : j \in [t,T]\}$,$I$ )
end for
*anomalyScore$_t$* = $\sum_m$ score[m]

Procedure 3 Assuming that anomalies happened at $t$, assigns a score to metric $m$ based on the match between expected temporal pattern of broken invariants and the observed pattern Input: metric $m$, set of all invariants $I$, list of broken invariants $\{L_j : j \in [t,T]\}$.
Output: score for metric $m$.
*initialize* metricScore[m] = 0
*initialize* expectedMetricScore[m] = 0
for all $j \in [t,T]$ do
    for all invariant $i$ in $I$ with metric $m$ do
        if ARX implies $i$ be broken at $j$ then
            incr. expectedMetricScore[m] by 1
            if $i$ is broken at $j$ then
                incr. metricScore[m] by 1
            end if
        end if
    end for
end for
metricScore[m] = $\frac{metricScore[m]}{expectedMetricScore[m]}$

FIG. 5

FAULT LOCALIZATION IN DISTRIBUTED SYSTEMS USING INVARIANT RELATIONSHIPS

This application is a continuation-in-part of U.S. application Ser. No. 13/738,004 filed Jan. 10, 2013 and claims the benefit of U.S. Provisional Application No. 61/675,974 filed Jul. 26, 2012, the disclosure of which is herein incorporated by reference.

BACKGROUND OF THE INVENTION

The invention relates generally to the field of fault detection and localization in complex systems. More specifically, the invention is related to a method for context-aware anomaly detection in multivariate time series.

In an existing system invariant analysis technology, invariants are discovered from monitoring data of large-scale distributed systems these invariants are further used for fault detection and isolation. Each invariant profiles a constant relationship between two monitoring metrics and the invariant network is consisted of these monitoring metrics as nodes and their invariants as edges. With this approach, when a fault occurs inside a large system, many invariants will break due to the dependency of its components. Now given the set of broken invariants at a time point, the key question is how to rank the anomaly of monitoring metrics so that system operators can follow the rank to investigate the root-case in problem troubleshooting.

In previous U.S. Pat. Nos. 7,590,513 and 8,019,584, by inventors in this patent application, there was provides a system invariant analysis invention which discovers invariants from monitoring data of large-scale distributed systems and further use these invariants for fault detection and isolation. Each invariant profiles a constant relationship between two monitoring metrics and the invariant network is consisted of these monitoring metrics as nodes and their invariants as edges. With this approach, when a fault occurs inside a large system, many invariants will break due to the dependency of its components. Now given the set of broken invariants at a time point, the key question is how to rank the anomaly of monitoring metrics so that system operators can follow the rank to investigate the root-case in problem troubleshooting.

Accordingly, there is a need for a method for metric ranking in invariant networks in distributed systems.

BRIEF SUMMARY OF THE INVENTION

The present invention provides a computer implemented method for temporal ranking in invariant networks includes considering an invariant network and a set of broken invariants in the invariant network, assuming, for each time point inside a window W, that each metric with broken invariants is affected by a fault at that time point, computing an expected pattern for each invariant of a metric with assumed fault, said pattern indicative of time points at which an invariant will be broken given that its associated metric was affected by a fault at time t, comparing the expected pattern with the pattern observed over the time window W; and determining a temporal score based on a match from the prior comparing These and other advantages of the invention will be apparent to those of ordinary skill in the art by reference to the following detailed description and the accompanying drawings.

BRIEF DESCRIPTION OF THE DRAWINGS

FIG. 5 details Procedures 1, 2 and 3 employed to compute a temporal score, in accordance with the invention.

DETAILED DESCRIPTION

In the first part of this application, ranking methods mRank and gRank are provided to solve the above issue of discovering invariants. The latter part of this application provides a temporal rank method which builds on the mRank and gRank methods.

Figure 1:
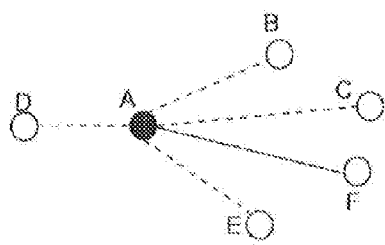
FIG. 1 depicts nodes representing monitoring metrics, in accordance with the invention.

The invention is directed to a method for metric ranking in invariant networks of distributed systems. The invariant network consists of monitoring metrics as nodes and invariant pair wise relationships of these nodes as edges. In the FIG. 1, the nodes A-F are the monitoring metrics such as CPU utilization, memory usage and volume of network packets etc. The edge represents the invariant between two associated nodes. At a time point, when a fault occurs, the broken invariant is represented by the dashed line and the good invariant is represented by the solid line. The inventive method employs a graph analysis and uses the neighborhood information to support the analysis of anomaly ranking. For example, the inventive method not only uses the ratio of broken invariants associated with A (among 5 invariants, 4 are broken) to rank its abnormal level but it also uses the broken invariant information from its neighbor (B-F here) to calculate the anomaly score of node A. In other words, the inventive method uses its immediate neighbor's information to support a node's anomaly ranking.

The framework for the invention is totally different from existing approaches so that there is no similar problem in other approaches. Although the problem of ranking is common in many areas such as webpage ranking in search engine results, the invariant network context for this invention includes thoroughly different invariant information and the goal of the inventive ranking method is also different.

Under the inventive method, given the invariant network and the set of broken invariants, two ranking processes are provided to determine and rank the anomaly scores of each monitoring metrics in large-scale systems. Operators can follow the rank to investigate the root-cause in a problem investigation. In an mRank process, given a node/metric, the invention determines multiple scores by integrating information from immediate neighbors to decide the anomaly score for metric ranking. In a gRank process, given a node/metric, an iteration process is used to recursively to integrate the information from immediate neighbors at each round to determine its anomaly score for metric ranking. A key inventive aspect is mRank and gRank processes include the step of integrating its anomaly score with its immediate neighbors' anomaly scores to decide their mutual influences on their anomaly scores so that the updated anomaly score is more accurate for metric ranking.

Figure 2:
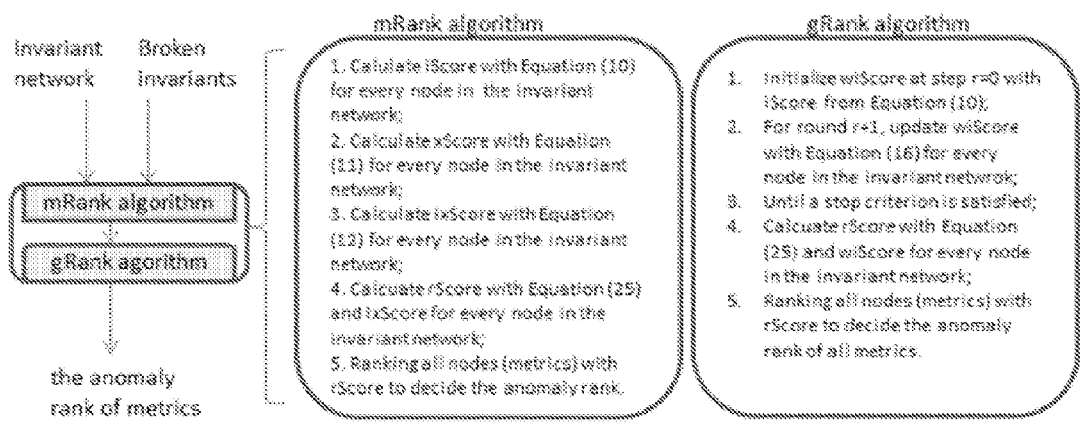
FIG. 2 shows the steps for metric ranking in an invariant network of a distributed system, in accordance with the invention.

Referring now to the block diagram of FIG. 2, there are shown the steps for metric ranking in an invariant network of a distributed system, in accordance with the invention. Invariant network information along with broken invariants are first analyzed under an mRank process and then under a gRank process. The mRank process includes quantifying steps eventually used to measure the anomaly degree each node in an invariant network. The gRank process, a weighted score mechanism, is an iterative process to determine a score to quantify the anomaly degree of each node. After both the mRank and gRank processes are applied, an anomaly rank of metrics is obtained.

Under the mRank process, in a first step, an iScore is based on the relationship (10) for every node in the invariant network. Relationship (10) defines the iScore of a node, $V_i$ ($1 \leq i \leq N$), within an invariant network I according to the relationship:

$$iScore_{V_i} = \frac{\text{number of broken links of } V_i}{\text{number of all links of } V_i}. \quad (10)$$

Then, under a second step, an xScore is determined based on the relationship (11) for every node in the invariant network. Relationship (11) defines an xScore of a node, $V_i$ ($1 \leq i \leq N$), within an invariant network I according to the relationship:

$$xScore_{V_i} = 1 - \frac{\text{number of broken links related to } BINNs}{\text{number of all links related to } BINNs}, \quad (11)$$

where BINNs represents broken-invariant-neighboring-nodes. The broken-invariant-neighboring-nodes of a node are those nodes, each of which connects to this node with a broken link. Note that, if one link is related to multiple nodes of BINNs, the invention only counts this link once for xScore.

Under a third step of the mRank process, there is a determination of iScore based on the relationship (12), ixScore=iScore+xScore, for every node in the invariant network. This ixScore is used to measure the anomaly degree of each node in an invariant network. From the above definitions, it can be seen that ixScore combines multiple evidences from a node itself and its neighbors to infer its anomaly degree. The anomaly degree of a node cannot be inferred independently, because the node itself and its neighbors naturally influence each other. In fact, all the nodes directly or indirectly influence each other through the network. However, we only quantify the influence of the first-order neighbors for a node in this invention.

Under a $4^{th}$ step of the mRank process, an rScore is based on the relationship $$rScore(V_i) = \frac{\sum_{k=1}^{K} r_{ia_k}}{K}. \quad (25)$$

Suppose for a node Vi with K related broken links, we get K ratios $r_{ia_k}$ (1_k_K), where ak is the node index. This means that the node Vak is connected to node Vi via a broken link. For example, For example, if we get three ratios, $r_{ia1}$, $r_{ia2}$ and $r_{ia3}$, for a node $V_i$, then, the rScore of $V_i$ is rScore($V_i$)=($r_{ia1}$+$r_{ia2}$+$r_{ia3}$)/3. In the above definition of rScore, we use the average of all ratios as rScore.

In the fifth step under the mRank process, the method ranks all nodes (metrics) with rScore to decide the anomaly rank.

Turning now to the first step of the gRank process, wiScore is initialized at step r=0 with iScore from relationship (10) above. The parameter wiScore is a weighted iScore. With the definition of iScore, we can determine the iScore for each node. Then, the iScore of one node is highly reliable if all iScores of its BINNs are relatively low. The wiScore of a node, $V_i$ ($1 \leq i \leq N$), within an invariant network I is based on the relationship $$wiScore_{V_i} = \frac{\sum_{V_k \in BINNs \text{ of } V_i} (1 - iScore_{V_k}) * 1}{\text{number of all links of } V_i}, \quad (15)$$

where $V_k$ denotes an individual node of BINNs of node $V_i$.

In the second step of the gRank process, for round r=1, wiScore is updated with relationship (16) for every node in the invariant network. Relationship (16) is based on $$wiScore_{V_i}^{r+1} = \frac{\sum_{V_k \in BINNs \text{ of } V_i} (1 - wiScore_{V_k}^{r}) * 1}{\text{number of all links of } V_i}, \quad (16)$$

where $wiScore_{V_i}^{r+1}$ denotes the wiScore of node $V_i$ at the end of round r+1 iteration.

The update of wiScore for round r+1 is continued until a stop criterion is satisfied.

In the $4^{th}$ step of the gRank process, there is a determination of rScore with equation (25) and a determination of wiScore for every node in the invariant network.

In the $5^{th}$ step, there is a ranking of all (nodes (metrics) with rScore to decide the anomaly rank of all metrics.

We now turn to the temporal ranking aspect of the invention. An invariant relationship between two (or more) metrics is described by an Auto-Regressive model with an Exogenous (ARX) model. Based on this model, we can derive the expected broken invariant pattern when a fault occurs. Our algorithm, temporal rank, compares the expected pattern against the observed pattern of broken invariants, and ranks the abnormal metric accordingly—close matching implies higher abnormality and hence, the corresponding metric gets a high rank.

Figure 4:
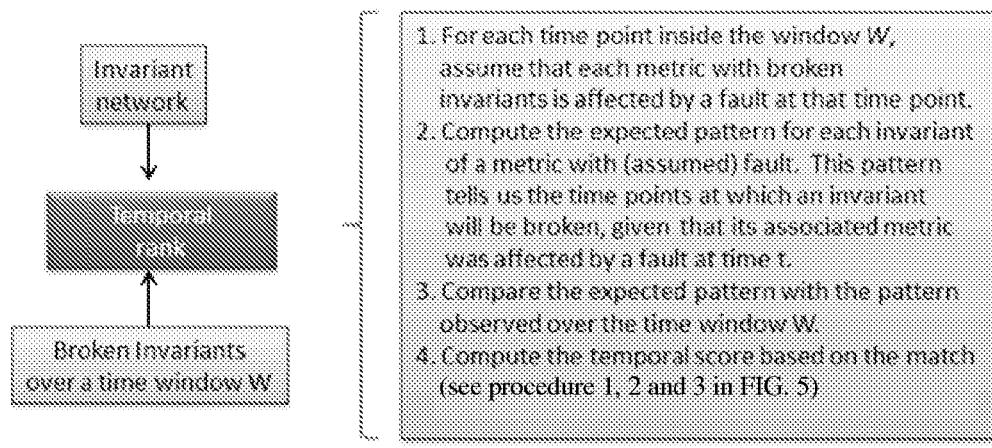
FIG. 4 shows a diagram for temporal ranking, in accordance with the invention.

Turning now to FIG. 4, there is shown a diagram detailing temporal ranking according to the invention. An invariant network is analyzed by the inventive temporal rank method to discover broken invariants over a time window W. First, for each time point inside the time window W, assume that each metric with broken invariants is affected by a fault at that time point. Secondly, compute the expected pattern for each invariant of a metric with (assumed) fault. This pattern indicates the time points at which an invariant will be broken, given that its associated metric was affected by a fault at time t. Thirdly, there is a comparing of the expected pattern with the pattern observed over the time window W. Lastly, a temporal score is computed based on the match, employing Procedures 1, 2 and 3 detailed in FIG. 5.

Procedures 1, 2, and 3 define the main steps of our inventive temporal approach. Based on observations up to the current time T, we select an interval of length w, [T−w, T], such that an anomaly at any t∈[T−w, T] can cause a broken invariant at T. Using the ARX model we set w=argmax(n, m+k). For each time t∈[T−w, T], Procedure 1 computes an anomaly score using Procedure 2. Procedure 2 computes this score assuming that all broken invariants at time t are due to anomalies affecting their corresponding metrics. It calculates the anomaly score for t as the sum of the score for each metric with broken invariants at time t. Procedure 3 computes the score for a metric based on the match between the expected and the observed broken invariant pattern. Thus, the overall anomaly score for a time t indicates support for the hypothesis that an anomaly occurred at this time while the score for a metric denotes how likely it is abnormal.

The mRank and gRank methods above look at the set of broken invariants at a single point in time. The temporal rank method looks at the behavior of invariants (broken as well as valid ones) over a time interval. The temporal rank algorithm defines the notion of the expected pattern of broken invariants, and proposes a mechanism for computing it. For certain types of faults, the temporal rank method can localize them both in terms of the metrics as well as the time when they occur. In contrast, the mRank and gRank methods assume that a fault has occurred at the time point that is being investigated.

Figure 3:
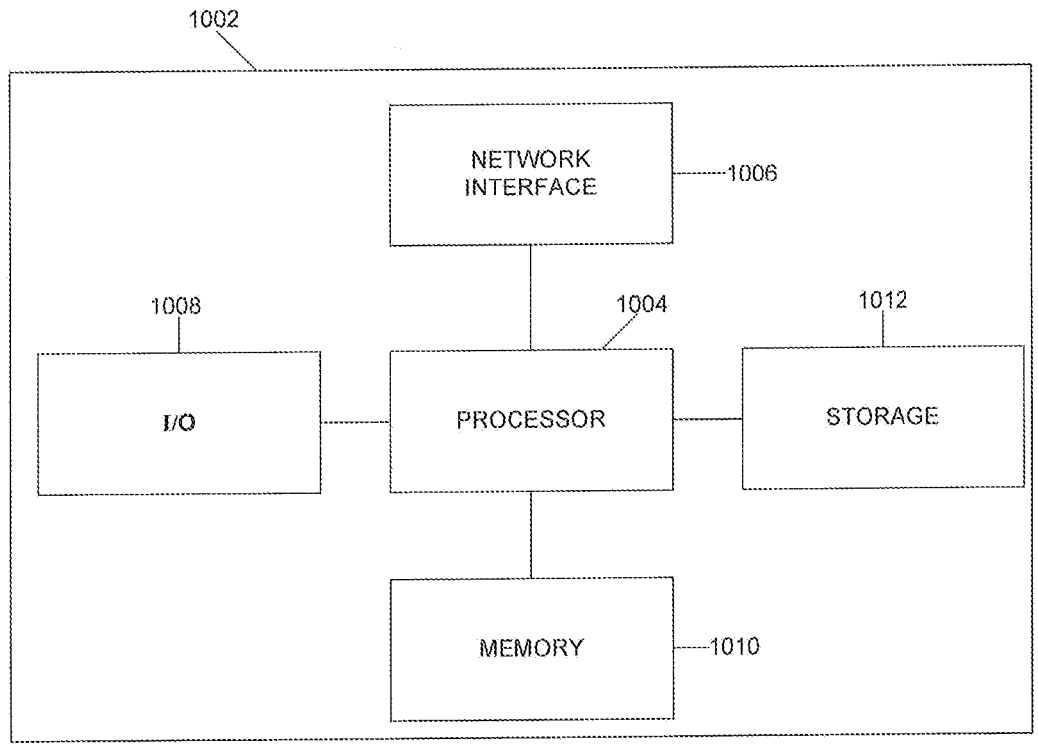
FIG. 3 shows a high level block diagram of a computer capable of implementing embodiments of the present invention.

The steps of the methods described herein may be performed by computers containing processors which are executing computer program code which defines the functionality described herein. Such computers are well known in the art, and may be implemented, for example, using well known computer processors, memory units, storage devices, computer software, and other components. A high level block diagram of such a computer is shown in FIG. 3. Computer 1002 contains a processor 1004 which controls the overall operation of computer 1002 by executing computer program instructions which define such operation. The computer program instructions may be stored in a storage device 1012 (e.g., magnetic disk) and loaded into memory 1010 when execution of the computer program instructions is desired. Thus, the operation of computer 1002 is defined by computer program instructions stored in memory 1010 and/or storage 1010 and the computer 1002 will be controlled by processor 1004 executing the computer program instructions. Computer 1002 also includes one or more network interfaces 906 for communicating with other devices via a network. Computer 1002 also includes input/output 1008 which represents devices which allow for user interaction with the computer 1002 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes. One skilled in the art will also recognize that the functionality described herein may be implemented using hardware, software, and various combinations of hardware and software.

From the foregoing it can be appreciated that the inventive methods for metric and temporal ranking improve the accuracy of anomaly metric ranking so that system operators can follow the rank to locate the root-cause quicker and spend less time and cost in incident investigation. Unlike the teachings of prior U.S. Pat. No. 7,590,513 where a ratio of broken invariants is considered, example looking at FIG. 1, the anomaly score of node A is 4/5, i.e. 4 invariants among total 5 invariants are broken. In the present inventive metric ranking method with mRank and gRank, the anomaly scores of its immediate neighbor (B-F here) are also used to influence the metric ranking of node A. Details on how to pull such neighbors' anomaly scores to determine node A's anomaly score are detailed in the appended "Additional Information" document which explains equations 11, 12, 16 and 25 regarding pulling neighbors' anomaly scores to determine A's anomaly scores. The inventive temporal ranking herein improves the accuracy of anomaly metric ranking so that system operators can follow the rank to locate the root-cause quicker and spend less time and cost in incident investigation.

The Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, Additional Information". It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer implemented method for temporal ranking in invariant networks comprising the steps of:
   considering an invariant network and a set of broken invariants in the invariant network;
   assuming, for each time point inside a window W, that each metric with broken invariants is affected by a fault at that time point;
   computing an expected pattern for each invariant of a metric with assumed fault, said pattern indicative of time points at which an invariant will be broken given that its associated metric was affected by a fault at time t;
   comparing the expected pattern with the pattern observed over the time window W; and
   determining a temporal score based on a match from the prior comparing, said determining comprises, based on observations up to a current time T, selecting an interval of length w, [T−w, T], such that an anomaly at any t∈[T−w, T] can cause a broken invariant at T and using an ARX model setting w=arg max(n, m+k).

2. The method of claim 1, wherein said determining comprises computing an anomaly score assuming that all broken invariants at time t are due to anomalies affecting their corresponding metrics.

3. The method of claim 2, wherein said determining comprises calculating the anomaly score for t as the sum of the score for each metric with broken invariants at time t.

4. The method of claim 3, wherein said determining comprises computing the score for a metric based on a match between expected and observed broken invariant pattern, wherein an overall anomaly score for a time t indicates support for an anomaly occurring at this time while the score for a metric denotes how likely it is abnormal.

5. The method of claim 1, wherein said determining comprises localizing faults in time and ranking abnormal metrics, a time score computation to support that an anomaly occurred at time t, and assuming anomalies happened at time t, assigning a score to a metric m based on the match between an expected temporal pattern of broken invariants and an observed pattern.

6. The method of claim 5, wherein said localizing faults in time and ranking abnormal risks comprises the following steps:
   receiving a set of all invariants I, list of broken invariants Lt at each time point t∈[T−w, T], T: current time
   for all t∈[T−w, T], do anomalyScore[t]=timeScore(t, T, {Lj:j2[t, T]}); and
   raise alarms for time points t with high anomaly score; at each of these time points focusing on metrics with high scores for further investigation.

7. The method of claim 5, wherein said time score computation comprises the following steps:
   receiving lists of broken invariants {Lj:j2[t, T]}, set of all invariants I, current time T;
   outputting an anomaly score for time t;

for all metric m with broken invariants in Lt, doing score [m]=metricScore(m, {Lj:j 2[t, T]}, I); and determining an anomaly $Score_t$ from $\Sigma$m score[m].

8. The method of claim 5, wherein said assigning a score to a metric m includes the following steps:

receiving metric m, set of all invariants I, and list of broken invariants $\{L_j:j\epsilon[t, T]\}$;

outputting a score for metric m;

initializing a metricScore[m] to 0;

initializing an expectedmetricScore[m] to zero; and recursively determining metricScore[m] from metricScore[m] divided by expectedMetricScore[m].

\* \* \* \* \*